Sept. 15, 1970 F. C. BUMB, JR 3,528,625

TAPE TRANSPORT ASSEMBLY WITH DRIVEN TAPE ROLL MEANS

Filed Nov. 5, 1968

INVENTOR.
FRANK C. BUMB, JR.
By White & Haefliger
ATTORNEYS.

United States Patent Office
3,528,625
Patented Sept. 15, 1970

3,528,625

TAPE TRANSPORT ASSEMBLY WITH DRIVEN TAPE ROLL MEANS

Frank C. Bumb, Jr., 8424 E. Longden Ave., San Gabriel, Calif. 91775

Filed Nov. 5, 1968, Ser. No. 773,381
Int. Cl. G03b *1/04;* G11b *15/32*
U.S. Cl. 242—192 15 Claims

ABSTRACT OF THE DISCLOSURE

The disclosure concerns a tape transport system wherein both the supply and take-up rolls of tape are separately peripherally driven by separate rotors having differential surface velocities.

BACKGROUND OF THE INVENTION

Figures 1, 1A, 2:
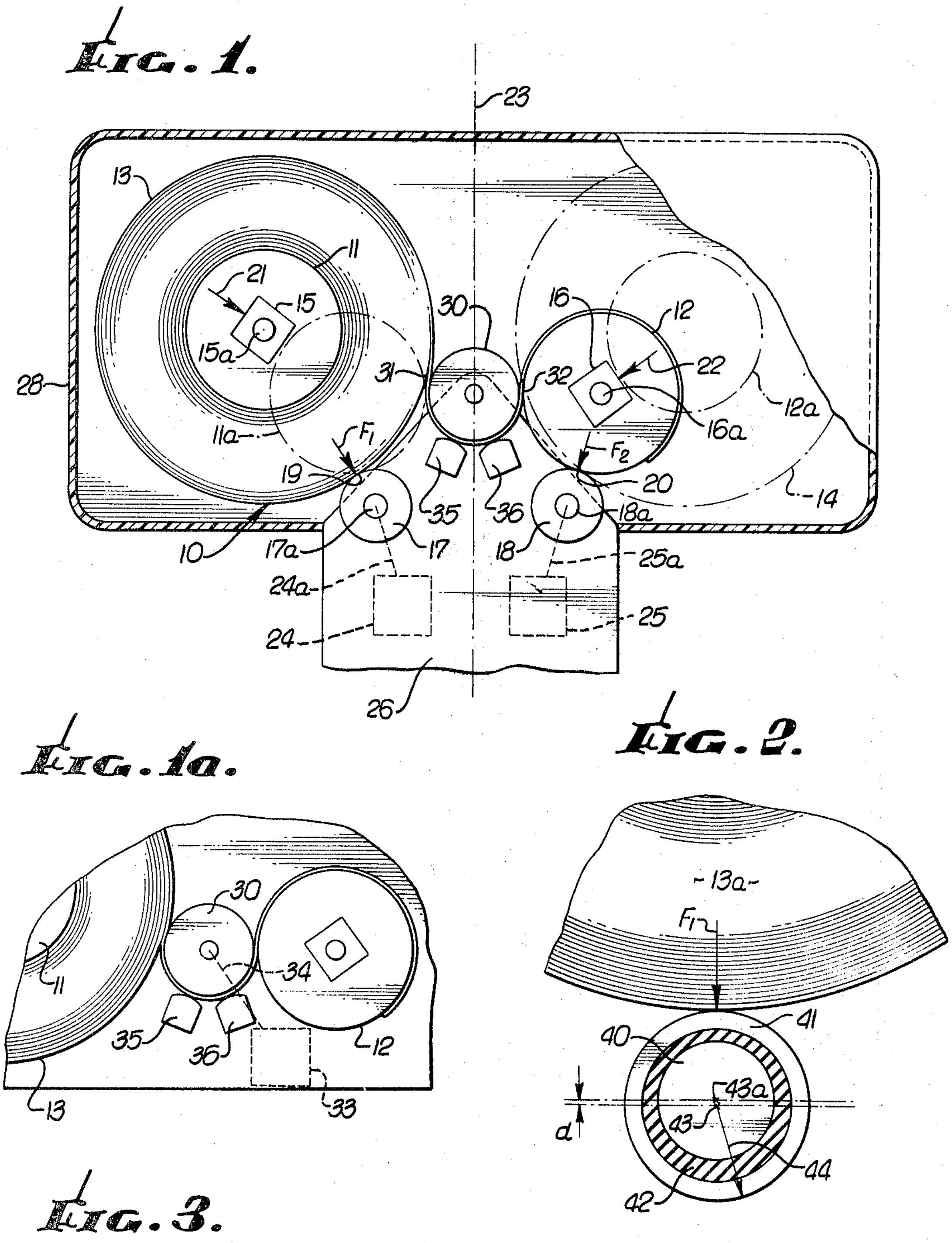

This invention relates generally to web or tape transport equipment. More specifically, it has to do with improvements in systems wherein information bearing tape is transported between supply and take-up rolls in response to drive means frictional engagement with the tape itself.

It has been conventional in the past to effect transport of magnetic or paper tape between rolls or packs on supply and take-up reels either by driving the reels themselves, or by driving a belt in peripheral engagement with the tape rolls. Reel drive systems have required the use of rather complex equipment, as for example constant tension servos, etc., to obtain the desired reel motion characteristics, one or two capstans being used to provide tape velocity control. As an example, certain applications require low flutter, constant tape velocity and constant tape tension, analog systems using frequency modulation and direct recording being illustrative. Tape engaging belt drive systems, while satisfactory for many purposes, present problems of belt lift and slippage and pack handling, especially in response to extremely fast accelerations and high speed conditions characteristic of digital and video recording and playback apparatus.

Quite recently, an effort made to resolve such problems has resulted in a concept wherein the tape supply and take-up rolls are both peripherally driven by means of a single capstan; however, while offering certain advantages, such a system does not satisfactorily overcome the problem of susceptibility of tape velocity and tension variations to vibrational disturbances occurring in operational environments. Also, such a system lacks desired flexibility in the arrangement said mounting of the transducer heads; it is not well adapted to bi-directional transporting of the tape; introduction and use of compliance in the drive becomes very difficult to achieve with simplicity (such compliance being useful in certain fast start and stop transports, as in digital transports); and the forces exerted between the tape packs or rolls and capstan must be constrained to be unequal.

SUMMARY OF THE INVENTION

It is a major object of the present invention to overcome these and other problems associated with prior systems through the provision of unusually effective and simple tape transport assembly wherein both the supply and take-up rolls of tape are separately peripherally driven in a novel and highly beneficial manner. Basically, the invention is embodied in an assembly that comprises a pair of carriers for tape to be transported from a supply role on one carrier to a take-up roll on the other carrier; a pair of rotors located to engage with pressure the tape rolls on the respective carriers for effecting rotation of the rolls on the carriers in order to accomplish the transport; and means to drive the rotors at angular velocities characterized in that the tape extent undergoing transportation between the supply roll and takeup roll is maintained in tension. Typically the rotors have tape engaging surfaces of diameter characterized in that the velocity $V_2$ of the rotor surface engaging the take-up roll exceeds the velocity $V_1$ of the rotor surface engaging the supply roll.

As will be seen the invention enables the elimination of many elements such as reel motors, tension-controlling reel brakes, clutches, frictionally dependent elements such as constant drag components, mechanical pinch rollers and tape engaging belts which are unwieldy, expensive and have limited life. Further, the invention enables the provision of very high, controlled speed drives of simple design, and with minimum logic needed to control operation of the transport. Also, as compared with the single capstan peripheral drive referred to above, the invention povides less susceptibility of tape velocity and tension to disturbances due to vibration, more flexibility in the arrangement and mounting of transducer heads, faster start-stop operation of the transport with a given torque drive motor, and lack of need for development of unequal forces on the two tape packs.

Additional objects and advantages of the invention include the provision for development and transmission of force $F_1$ between one rotor and the supply roll and another force $F_2$ between the second rotor and the take-up roll, such forces being equal or unequal; the provision of force exerting means including structure mounting the tape carriers for movement relatively toward the respective rotors; the provision on at least one rotor of an annular portion defining the tape engaging surface, that portion typically being deflectible; the provision of a support roller engaging at least one tape roll in spaced relation to the rotor peripherally engaging that roll; and the provision for cartridge mounting of the tape packs and carriers.

These and other objects and advantages of the invention, as well as the details of illustrative embodiments, will be more fully understood from the following detailed description of the drawings, in which:

DRAWING DESCRIPTION

FIG. 1 is a schematic plan view of a tape transport assembly incorporating the invention;

FIG. 1*a* illustrates a modification of FIG. 1; and

Figure 3:
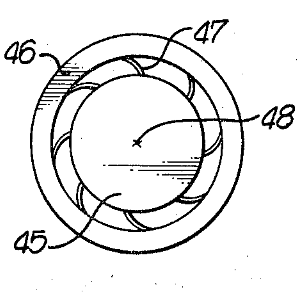

FIGS. 2 and 3 are plan views of modified drive rotors usuable in the invention.

DESCRIPTION OF PREFERRED EMBODIMENT

Referring first to FIG. 1, the tape transport assembly 10 illustrated includes a pair of carriers, or flangeless reels, 11 and 12, for tape to be transported from a supply roll on one carrier to a take-up roll on the other carrier. Tape stored on carrier 11 is indicated in the form of a supply roll 13, and tape is transferred to the take-up roll on carrier 12. When full, the roll on carrier 12 has the outline shown in broken lines 14. The carriers are freely rotatable on mounts 15 and 16 that include spindles **15*a* and 16*a***.

The assembly also includes a pair of rotors 17 and 18 located to engage with pressure the tape rolls on the respective carriers for effecting rotation of the rolls on the carriers in order to accomplish tape transport. For example, rotor 17 has pressural engagement with the tape roll on carrier 11 at the location 19, and rotor 18 has pressural engagement with the tape roll on carrier 12 at the location 20. Such pressural engagement is indicated by the forces $F_1$ and $F_2$ acting at the respective locations 19 and 20, and it will be understood that equal and opposite forces exist at each of such location, whereby the tape rolls may be urged toward the rotors, or vice versa, to achieve such force applications at those locations.

Merely as illustrative, force exerting means operable to maintain such pressural engagements of the tape rolls with rotors 17 and 18 may be considered to include the mounts 15 and 16 for the carriers, and to which suitable forces are transmitted as indicated by force vectors 21 and 22. In this regard, mounts 15 and 16 are movable in such manner that supply carrier 11 is moved from solid line position 11 to broken line position 11*a* as tape unwinds off that carrier, and take-up carrier 12 is moved from solid line position 12 to broken line position 12*a* as tape winds on to that carrier. Further, upon reversing, carrier 12 acts as a supply and carrier 11 as a take-up. It should be noted that in moving from position 11 to position 11*a*, carrier 11 moves generally toward the rotor 17; and likewise in moving from position 12 to position 12*a*, carrier 12 moves generally away from rotor 18. Finally, it is seen the rotors and carriers are generally symmetric with respect to the plane 23.

The assembly additionally includes means to drive the rotors at angular velocities characterized in that the tape extent undergoing transportation between the supply roll and take-up roll is maintained in tension. As will be seen, such tape tension may typically be maintained by the drive means nearly independently of the relationship of the force $F_1$ and $F_2$, whereby they may be equal or unequal and may vary in magnitude so long as a condition of non-slip engagement of the rotors with the tape rolls is maintained. This offers a considerable advantage over that prior system wherein both tape rolls are driven by one rotor, requiring a definite magnitude relationship of the forces transmitted by the two rolls to that rotor. Note also that forces $F_1$ and $F_2$ in FIG. 1 need not be in alignment, lending freedom to the design of the system as respects relative locations of the tape carriers and drive rotors.

Merely as illustrative, the rotor drive means include the rotor shafts 17*a* and 18*a*, and suitable mechanism indicated at 24 and 25 as having operative connection at 24*a* and 25*a* with those respective shafts. Such mechanism may for example include a motor or motors, together with any necessary belting. A suitable support for these elements 17, 18, 17*a*, 18*a*, 24, 25 and 24*a* and 25*a* is indicated at 26, and a suitable cartridge for the tape rolls and carriers is indicated at 28. As noted above, the mount 26 may include structure to urge the rotors and their shafts toward the tape rolls.

For there to be tension in the tape undergoing transportation between the rolls, the rotors 17 and 18 must have tape engaging surfaces of diameter and deformation characterized in that the velocity $V_2$ of the rotor surface engaging the take-up roll at 20 exceeds the velocity $V_1$ of the rotor surface engaging the supply roll at 19. Accordingly, it can be seen that rotation of the supply roll is restrained relative to rotation of the take-up roll, rotor 17 being one form of restraint means. In general, this velocity difference $V_2-V_1$, is a function of the physical parameters of the tape (Young's modulus E, and the cross-sectional area $A_t$ of the tape), the desired tape tension; and the shear deflection of the surface of rotors 17 and 18; further for practical magnetic recording tape this difference will be small, i.e. less than 3% and usually on the order of ½% of $V_1$ and $V_2$.

FIG. 1 also indicates the presence of a support capstan or rotor 30 engaging at least one and typically both tape rolls in spaced relation to the rotors 17 and 18 and to their roll engagement points 19 and 20. Rotor 30 may for example comprise an idler, with the additional function of acting as a guide for tape being transported between the two principal rolls. Note for example that the tape leaves the supply roll at 31 on one side of rotor 30, and joins the take-up roll at 32 on the opposite side of the rotor 30. It is also contemplated that rotor 30 may be driven, as indicated by the schematic drive 33 connected to the rotor at 34, as seen in FIG. 1*a*. In this event the velocity $V_3$ of the surface of rotor 30 engaging the rolls should lie between $V_1$ and $V_2$, i.e. $V_2>V_3>V_1$. The locations of recording and reproducing heads may be varied; however, merely for illustration, possible locations are indicated at 35 and 36. Rotors 17 and 18 are used in FIG. 1*a*, but not shown, for clarity.

In FIG. 1 the rotors 17 and 18 are substantially non-compliant, i.e rigid FIGS. 2 and 3 show other rotors which may be used and characterized as compliant, i.e. capable of small variation of radius in response to variation of force $F_1$ or $F_2$, for controlling tension in the tape being transported. In FIG. 2, a rigid central hub 40 is connected to a concentric annulus 41 concentric elastic material 42 such as plastic or rubber. The center of rotation 43 of the annulus 41 is shifted by the amount "*d*" from coincidence with the center of rotaton 43*a* of the hub 40, in response to application of the force $F_1$, via the tape roll 13*a*, whereby the effective radius of the rotor assembly 44 driving the tape roll is reduced by the amount "*d*" from the actual radius of the annulus outer surface. Note the displacement of the elastic material 42. In FIG. 2 a rigid solid hub 45 and rigid solid annulus 46 are spaced apart and connected by a circular series of metal straps 47 which spiral about the axis 48. Here again, the annulus deflects in response to pressural engagement with a tape roll. Alternatively, the outer portion of a solid rotor may be made of material that is semi-rigid (for example hard rubber) so as to be compliant.

I claim:

1. In a tape transport assembly, a pair of carriers for tape to be transported from a supply roll on one carrier to a take-up roll on the other carrier, a pair of rotors located to engage with pressure the tape rolls on the respective carriers for effecting rotation of the rolls on the carriers in order to accomplish said transport, and means to drive the rotors at differential surface velocities characterized in that the tape extent undergoing transportation between the supply roll and the take-up roll is mainained in tension.

2. The assembly of claim 1 wherein said rotors have tape engaging surfaces characterized in that the velocity $V_2$ of the rotor surface engaging the take-up roll exceeds the velocity $V_1$ of the rotor surface engaging the supply roll.

3. The assembly of claim 1 including means exerting forces operable to maintain said pressural engagements of the tape rolls with the respective rotors.

4. The assembly of claim 3 wherein a force $F_1$ is transmitted between one rotor and the supply roll and another force $F_2$ transmitted between another rotor and the take-up roll, said forces being out of alignment.

5. The assembly of claim 3 wherein said force exerting means includes structure mounting the carriers for movement relatively toward and away from said respective rotors.

6. The assembly of claim 3 wherein said force exerting means includes structure mounting the rotors for movement relatively toward said respective carriers.

7. The assembly of claim 2 wherein at least one of said rotors has an annular portion defining said tape engaging surface.

8. The assembly of claim 3 wherein both of said rotors have generally annular portions defining said tape engaging surfaces.

9. The assembly of claim 8 wherein said rotors have hub portions mounting said generally annular portions to be deflectible in response to transmission of said forces.

10. The assembly of claim 9 including compliant means interconnecting said hub portions and annular portions.

11. The assembly of claim 1 including said tape which extends between the rolls without wrapping about said rotors.

12. The assembly of claim 1 including said tape in the form of magnetic tape, and including a transducing head extending in magnetically interacting relation with the tape.

13. The assembly of claim 1 including a support roller engaging at least one tape roll in spaced relation to the rotor engaging said roll.

14. The assembly of claim 13 wherei said roller engages both tape rolls, the tape leaving one roll at one side of said roller and joining the other roll at the opposite side of said roller.

15. The assembly according to claim 1 including a cartridge mounting and containing said carriers.

References Cited

UNITED STATES PATENTS

| | | | |
|---|---|---|---|
| 2,441,679 | 5/1948 | Wade | 179—100.2 |
| 2,979,277 | 4/1961 | Page et al. | 242—201 |
| 3,291,409 | 12/1966 | McClellan | 242—192 |

LEONARD D. CHRISTIAN, Primary Examiner

U.S. Cl. X.R.

242—65